(12) United States Patent
Van Der Weide et al.

(10) Patent No.: US 7,769,106 B2
(45) Date of Patent: Aug. 3, 2010

(54) RECONFIGURABLE PULSE DETECTOR IN WIRELESS COMMUNICATIONS SYSTEM

(75) Inventors: Gerard Van Der Weide, Eindhoven (NL); Raf Lodewijk Jan Roovers, Eindhoven (NL); Harish Kundur Subramaniyan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 666 days.

(21) Appl. No.: 10/599,989

(22) PCT Filed: Apr. 11, 2005

(86) PCT No.: PCT/IB2005/051182

§ 371 (c)(1),
(2), (4) Date: Oct. 17, 2006

(87) PCT Pub. No.: WO2005/101679

PCT Pub. Date: Oct. 27, 2005

(65) Prior Publication Data

US 2008/0292020 A1 Nov. 27, 2008

(30) Foreign Application Priority Data

Apr. 19, 2004 (EP) ................................. 04101607

(51) Int. Cl.
*H03K 9/00* (2006.01)
*H04L 27/00* (2006.01)

(52) U.S. Cl. ....................................... 375/316; 375/259
(58) Field of Classification Search ................. 375/130, 375/259–260, 316, 342, 367
See application file for complete search history.

(56) References Cited

U.S. PATENT DOCUMENTS

| 4,578,646 | A | * | 3/1986 | Maio et al. ................... 327/341 |
| 5,764,551 | A | | 6/1998 | McCorkle |
| 2001/0033576 | A1 | | 10/2001 | Richards |
| 2002/0154061 | A1 | | 10/2002 | Frazier et al. |
| 2003/0108133 | A1 | * | 6/2003 | Richards ...................... 375/351 |
| 2004/0017861 | A1 | * | 1/2004 | Kobayashi et al. .......... 375/317 |
| 2004/0042561 | A1 | | 3/2004 | Ho et al. |
| 2005/0018750 | A1 | * | 1/2005 | Foerster et al. .............. 375/130 |

FOREIGN PATENT DOCUMENTS

| WO | WO0014910 A1 | 3/2000 |
| WO | WO0193444 A1 | 12/2001 |

* cited by examiner

*Primary Examiner*—Jean B Corrielus

(57) ABSTRACT

In a receiver architecture, for example for use in receiving pulses in an Ultra Wideband system, a received signal is applied to a mixer, together with pulses which correspond to expected received pulses. The mixer output is applied to a block, which can be configured either as an integrator or as a filter. When no pulses are being received, this block is configured as a filter, allowing it to lock quickly to any new sequence of pulses, while, when the system has locked to a sequence of pulses, the block is configured as an integrator, so that an improved signal-noise ratio can be achieved.

14 Claims, 4 Drawing Sheets ic
RECONFIGURABLE PULSE DETECTOR IN WIRELESS COMMUNICATIONS SYSTEM This application is a 371 of PCT/IB2005051182, filed on Apr. 11, 2005, which claims benefit of European Patent Office (EPO) application No. 04101607.2, filed Apr. 19, 2004.

This invention relates to wireless communications, and in particular to a receiver for use in a wireless communications system. More particularly, the invention relates to a device and a method for pulse detection, for example for use in an Ultra Wideband (UWB) wireless communications system. The communications system may be in the form of a signaling system, in which data is sent from a transmitter to a receiver, or it may be in the form of a radar or positioning system, in which a combined transmitter/receiver detects the reflections of signals which it has itself transmitted.

The term Ultra Wideband is used to refer to a number of different wireless communications systems. In one form of an Ultra Wideband (UWB) communications system, a transmitter generates a series of pulses, which are transmitted at radio frequencies. The function of the receiver is then to detect these pulses, in order to be able to extract data from the transmitted signal.

WO 01/93444 discloses a UWB receiver, for detecting pulses in an incoming signal. The received signal is amplified, and then applied to one input of a mixer. A clock signal is applied to a pulse shaper, which generates a series of local pulses, which may for example be square pulses. These pulses are applied to the other input of the mixer, and multiplied with the received signal.

An integrator then accumulates the mixer output over a predetermined period, and the accumulated output is sampled in an analog-to-digital converter, at a rate that corresponds to a source bit rate. The output of the analog-to-digital converter is then provided to a digital controller for further processing of the received signal.

However, this architecture has the disadvantage that it may take a significant time period for the system to lock on to the new sequence of pulses.

In a possible alternative architecture, the mixer output could be supplied not to an integrator, but to a low-pass filter. Compared with the architecture shown in WO 01/93444, this would have the advantage that the low-pass filter could track the input signal better than the integrator, and so the system would be able to lock faster to a new sequence of pulses. However, it would have the disadvantage that the gain is lower than that of the integrator, and so the achievable signal-noise ratio of the receiver may well be lower.

According to a first aspect of the present invention, there is provided a receiver architecture, in which the mixer output is applied to a block which can be configured either as an integrator or as a filter.

According to the second aspect of the invention, there is provided a method of operation of such a receiver, in which, when no pulses are being received, the block is configured as a filter, allowing it to lock quickly to any new sequence of pulses, while, when the system has locked to a sequence of pulses, the block is configured as an integrator, so that the improved signal-noise ratio can be achieved.

Figure 1:
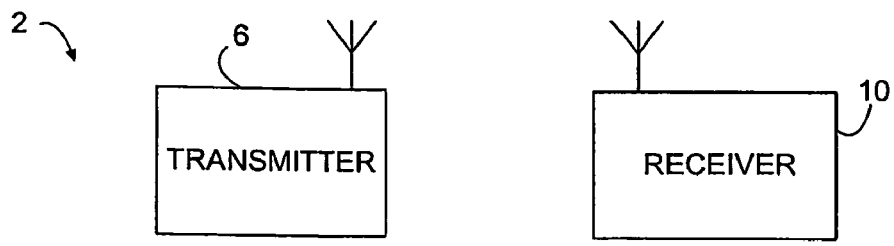
FIG. 1 is a block schematic diagram of a wireless communications system in accordance with the present invention.

FIG. 1 is a block schematic diagram of a wireless communications system 2, which includes a radio transmitter 6 and a radio receiver 10. In particular, the system is an Ultra Wideband (UWB) wireless communications system, of a type in which signals are transmitted in the form of pulses.

As shown in FIG. 1, the pulses may be transmitted from a separate device 6, for the purpose of transmitting data from that separate device to the receiver 10. Alternatively, the transmitter 6 and receiver 10 may form part of a single device, with the receiver then being used to detect reflections of pulses transmitted from the device, for the purposes of radar or positioning, for example.

Figure 2:
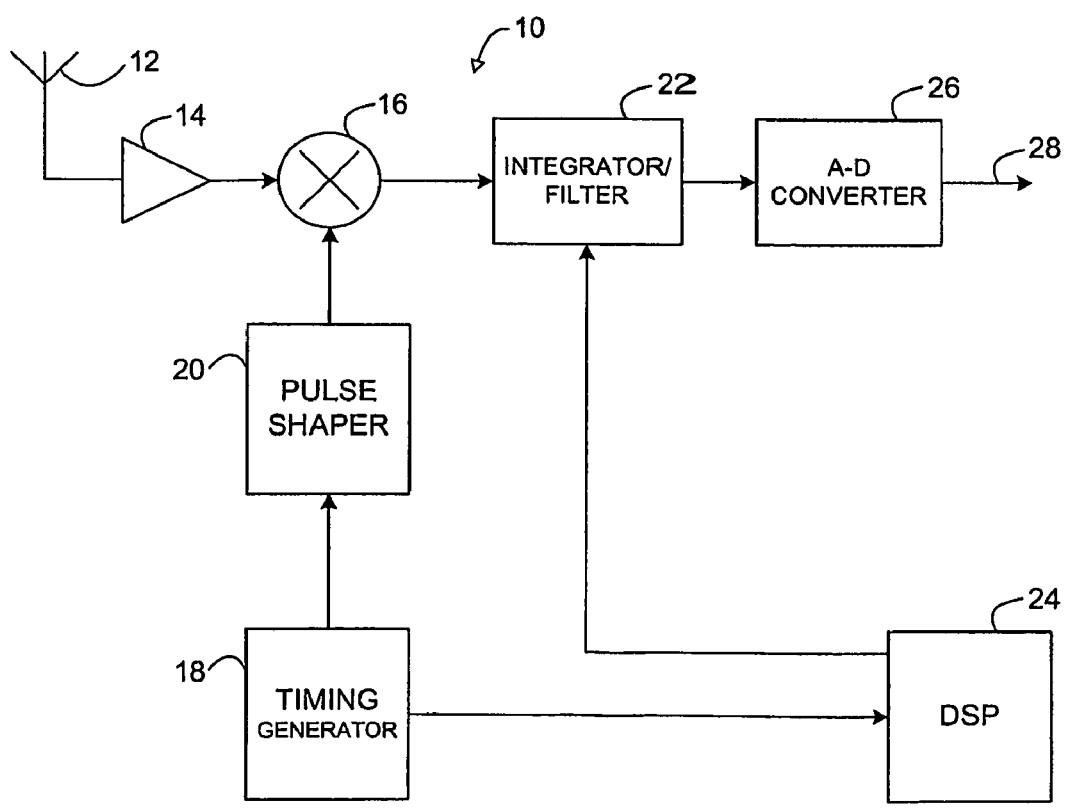
FIG. 2 is a block schematic diagram of a radio receiver in accordance with an aspect of the present invention.

FIG. 2 shows in more detail the form of the receiver 10. Signals are received by an antenna 12, and then amplified in an amplifier 14. The amplified signals are passed to a first input of a mixer 16.

At the same time, a timing generator 18 produces a clock signal, which is applied to a pulse shaper 20.

The pulse shaper 20 generates pulses, in a form which corresponds to the expected shape of received pulses, and this expected shape will depend upon the communications system in which the receiver is to be used. As is generally conventional, the receiver has information about the time positions at which pulses are expected. The timing generator 18 can therefore control the pulse shaper 20 so that the pulses become synchronized with the received signals.

In some situations, the receiver will be used in a communications system in which square pulses are transmitted, while, in other cases, the receiver will be intended for use in a communications system in which other forms of pulse, for example sinusoidal, or part-sinusoidal, pulses, are transmitted.

The pulses, in the shape of the expected received pulses, are then applied to the second input of the mixer 16, in which the received signal is multiplied by the pulses generated in the pulse shaper 20.

The output of the mixer 16 is then supplied to a block 22, which can be configured to act either as an integrator or as a filter, as will be described in more detail below. The block 22 operates under the control of a control signal supplied from a digital signal processor (DSP) 24, which also receives a clock signal from the timing generator 18. The output from the integrator/filter block 22 is supplied to an analog-to-digital converter 26, and the resulting digital signal is supplied on an output line 28, where it can be further processed, for example to retrieve the information content of the received signal in the case of a data transmission system.

Figure 3:
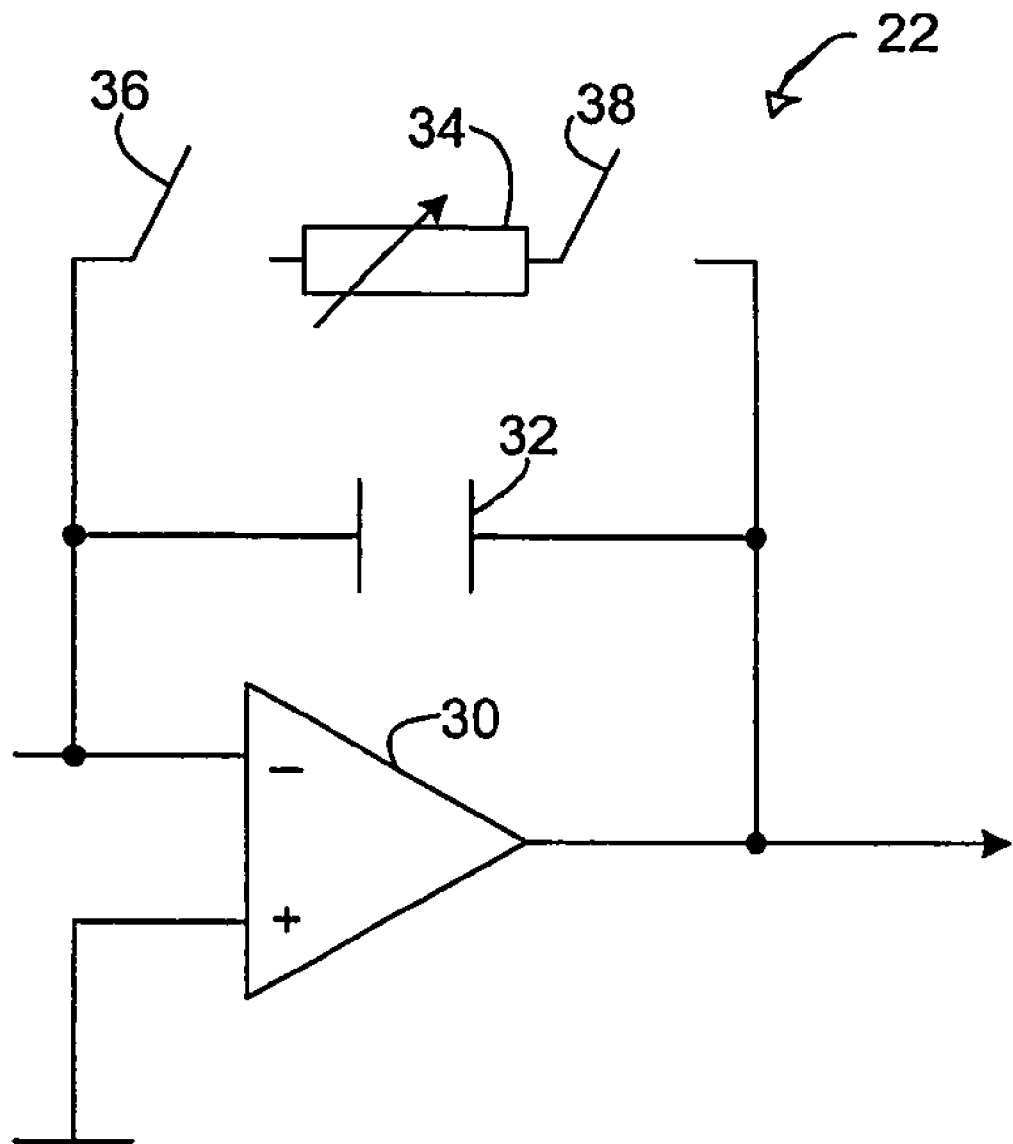
FIG. 3 is a block schematic diagram showing in more detail the form of the reconfigurable integrator/filter block in a preferred embodiment of the receiver of FIG. 2.

FIG. 3 is a schematic diagram, showing a possible form of the integrator/filter block 22 in the receiver 10 of FIG. 2.

The block 22 is based around an operational amplifier 30, the non-inverting input of which is connected to ground, while the inverting input receives the signal output from the mixer 16.

A feedback loop from the output of the operational amplifier 30 to its inverting input contains a capacitor 32, in parallel with a variable resistor 34. The resistor 34 can be switched into and out of the loop by means of switches 36, 38, which operate under the control of the control signal supplied from the digital signal processor 24.

When the resistor 34 is out of the feedback loop, the amplifier 30 behaves as an integrator. When the resistor 34 is switched into the feedback loop, the amplifier 30 behaves as a low-pass filter. As shown in FIG. 2, the resistor 34 has a variable resistance value. The resistance value has an effect on the low-frequency gain, and the position of the filter pole, of the low-pass filter. Depending on the noise level which is affecting the received signal, it may be advantageous to vary the low-frequency gain during the period while the receiver is attempting to synchronize to the pulses of the received signal. The resistance value can therefore be adjusted to provide the appropriate level of gain.

Figure 4:
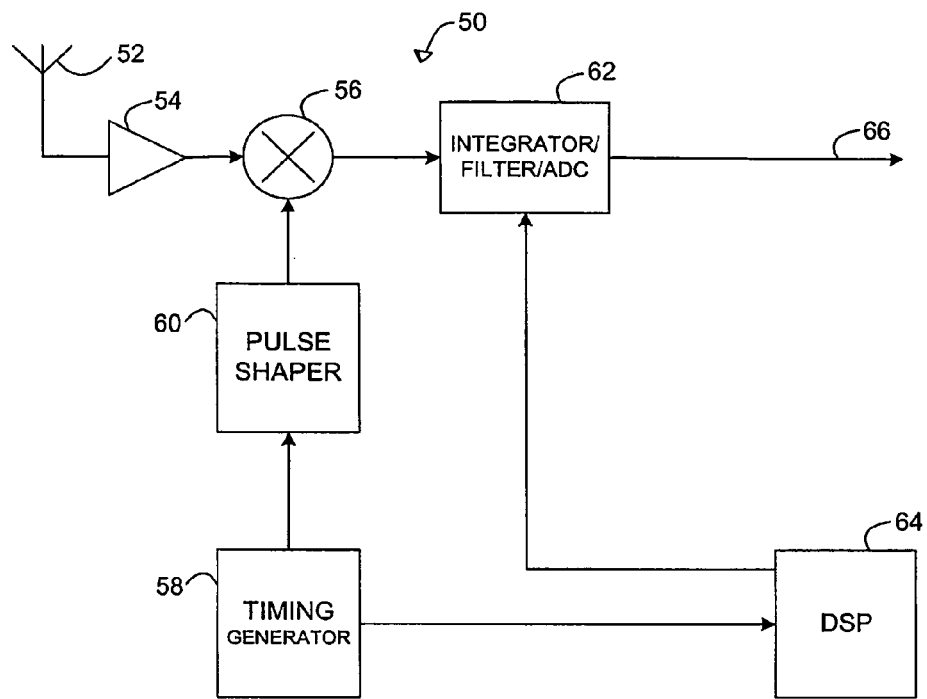
FIG. 4 is a block schematic diagram of an alternative radio receiver in accordance with an aspect of the invention.

FIG. 4 is a block schematic diagram of an alternative form of radio receiver, in accordance with an embodiment of the invention. Again, the receiver 50, shown in FIG. 4, is suitable for detecting pulses transmitted in a UWB wireless communications system. Signals are received by an antenna 52, and then amplified in an amplifier 54. The amplified signals are passed to a first input of a mixer 56.

At the same time, a timing generator 58 produces a clock signal, which is applied to a pulse shaper 60. The pulse shaper 60 generates pulses, in a form which corresponds to the expected shape of received pulses. Again, this expected shape will depend upon the communications system in which the receiver is to be used. These pulses are applied to the second input of the mixer 56, in which the received signal is multiplied by the pulses generated in the pulse shaper 60.

The output of the mixer 56 is then applied to a block 62, which can be configured to act either as an integrator or as a filter, as will be described in more detail below, but which also acts as an analog-to-digital converter. The block 62 operates under the control of a control signal supplied from a digital signal processor (DSP) 64, which also receives a clock signal from the timing generator 58.

The digital signal generated by the block 62 is supplied on an output line 66, where it can be further processed, for example to retrieve the information content of the received signal in the case of a data transmission system.

Figure 5:
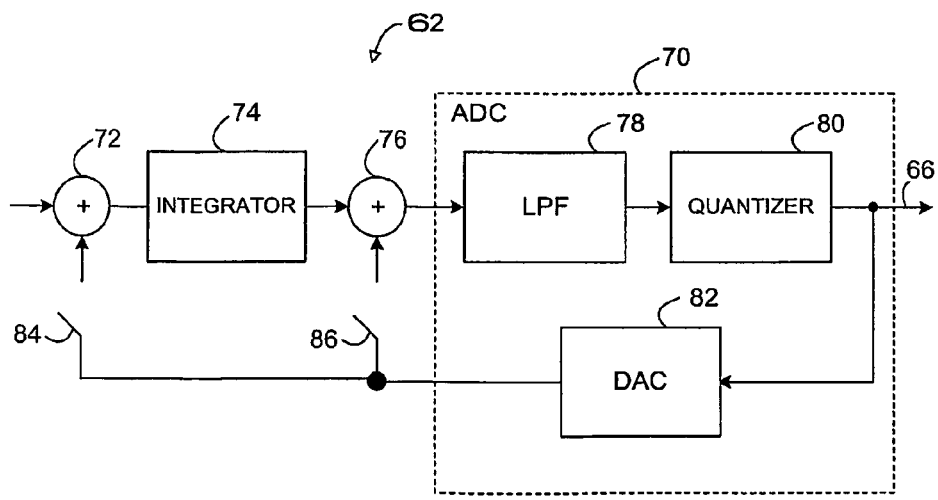
FIG. 5 is a block schematic diagram showing the form of the reconfigurable integrator/filter block in a preferred embodiment of the receiver of FIG. 4.

FIG. 5 is a schematic diagram, showing a possible form of the block 62 in the receiver 50 of FIG. 4.

The block 62, as shown in FIG. 5, is based around a sigma-delta modulator 70 acting as an analog-to-digital converter (ADC). This is a conventional form of ADC, which already includes a filter. As a result, in view of the advantages of this form of ADC, it may be more efficient to use an ADC of this form, and also to use the function of the filter within the ADC.

In FIG. 5, it can be seen that the output from the mixer 56 is applied to a first input of a first adder 72, whose output is applied to an integrator 74. The output of the integrator 74 is applied to a first input of a second adder 76, and the output of the adder 76 is applied as an input to the sigma-delta ADC 70.

Specifically, the output from the adder 76 is applied firstly to a low pass filter 78, and then to a quantizer 80, to provide an output on line 66 in digital form.

As is conventional in a sigma-delta ADC, the output from the quantizer 80 is passed back around a feedback loop, firstly being converted back into analog form in a digital-to-analog converter (DAC) 82.

The operation of the feedback loop then depends upon the action of two switches 84, 86, which are controlled by control signals from the DSP 64.

When the first switch 84 is open and the second switch 86 is closed, the received signal is simply applied first to the integrator 74, which acts in a conventional way, and is then applied to the sigma-delta ADC 70, which again operates in a conventional way to convert the signal into digital form.

By contrast, when the first switch 84 is closed and the second switch 86 is open, the integrator 74 appears in the feedback loop.

The result in this case is that the block 62 effectively acts as a low pass filter with an analog-to-digital conversion function. More specifically, the block 62 acts as a sigma-delta ADC, in which the order of the low pass filter within the feedback loop has increased by one. The effect of this is small on signals within the signal bandwidth, which occurs at baseband, because the filter has a low-pass characteristic. However, quantization noise generated in the loop is filtered by a higher order filter, and is therefore filtered out more strongly. The result is that the output signal has an improved signal-noise ratio.

The result is that, with the first switch 84 closed and the second switch 86 open, the block 62 is able to lock quickly to a new sequence of pulses received by the antenna 52, while, with the first switch 84 open and the second switch 86 closed, the block 62 provides a large gain and hence a good signal-noise ratio.

Figure 6:
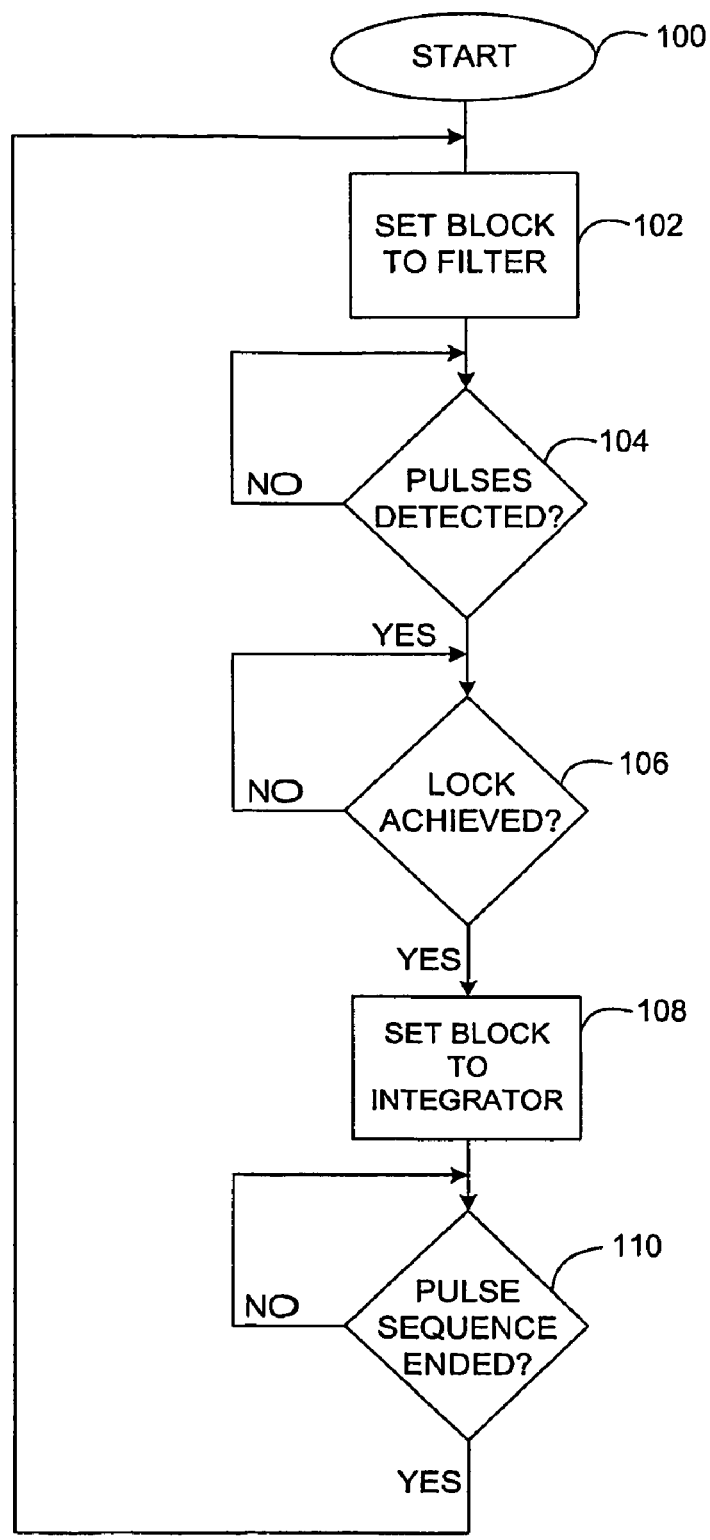
FIG. 6 is a flow chart showing a method of operation of the receiver of FIG. 2 or FIG. 4.

FIG. 6 is a flow chart showing a method of operation of a receiver in accordance with the invention, and this method can be applied either to the receiver shown in FIGS. 2 and 3, or to the receiver shown in FIGS. 4 and 5.

The process starts at step 100, at a time when no pulses are being received. In step 102, the block 22 (in the embodiment of FIGS. 2 and 3) or 62 (in the case of the embodiment shown in FIGS. 4 and 5) is set to act as a filter. That is, in the case of the embodiment shown in FIGS. 2 and 3, a control signal is sent from the digital signal processor 24 to close the switches 36, 38. In the case of the embodiment shown in FIGS. 4 and 5, a control signal is sent from the digital signal processor 64 to close the first switch 84 and open the second switch 86.

In step 104, it is then determined whether any received pulses can be detected, and this step repeats until such time as pulses are detected, at which time the process passes to step 106.

In step 106, it is determined whether the receiver has locked on to the received sequence of pulses. This determination can be made by a method which is known to the person skilled in the art, for example as described in WO 00/14910. Step 106 is then repeated until such time as the receiver has locked to the received sequence of pulses. At this time, the process passes to step 108, and the block 22 (in the case of the embodiment shown in FIGS. 2 and 3) or 62 (in the case of the embodiment shown in FIGS. 4 and 5) is set to act as an integrator.

That is, in the case of the embodiment shown in FIGS. 2 and 3, a control signal is sent from the digital signal processor 24 to open the switches 36, 38. In the case of the embodiment shown in FIGS. 4 and 5, a control signal is sent from the digital signal processor 64 to open the first switch 84 and close the second switch 86.

Therefore, in the initial acquisition phase, the correlator output is supplied to a filter, to allow fast locking to the received sequence of pulses. Thereafter, during the accumulation phase, the correlator output is supplied to an integrator, which provides a high gain in order to maximize the signal-noise ratio in the received signals, and thereby allow more accurate pulse detection.

The invention claimed is:

1. A radio receiver, comprising:
   a pulse generator, for generating pulses based on an expected received signal;
   a multiplier, for multiplying a received signal by the generated pulses; and a circuit for receiving the multiplier output, wherein said circuit is for operating in a first mode as a low-pass filter, and for operating in a second mode as an integrator, wherein said circuit operates in the first mode before the generated pulses are synchronized to the received signal and operates in the second mode after the generated pulses are synchronized to the received signal.

2. A receiver as claimed in claim 1, comprising an analog-to-digital converter, for receiving an output from said circuit.

3. A receiver as claimed in claim 1, wherein said circuit includes an analog-to-digital converter.

4. A radio receiver, comprising:
a pulse generator, for generating pulses based on an expected received signal;
a multiplier, for multiplying a received signal by the generated pulses; and
a circuit for receiving the multiplier output, wherein said circuit is for operating in a first mode to act as a low-pass filter, and for operating in a second mode to act as an integrator, wherein said circuit comprises a sigma-delta analog-to-digital converter having a feedback loop, and an integrator, wherein, in said first mode, said integrator is included in said feedback loop of said sigma-delta analog-to-digital converter, and, in said second mode, the output of the multiplier is connected to the integrator, and the integrator output is connected to the sigma-delta analog-to-digital converter.

5. A radio receiver, comprising:
a pulse generator, for generating pulses based on an expected received signal;
a multiplier, for multiplying a received signal by the generated pulses; and
a circuit for receiving the multiplier output, wherein said circuit is for operating in a first mode to act as a low-pass filter, and for operating in a second mode to act as an integrator
means for controlling said circuit to operate in said first mode before the receiver is synchronized to the received signal, and to operate in the second mode when the receiver is synchronized to the received signal.

6. A method of operating a radio receiver, comprising:
multiplying a received signal by a sequence of generated pulses to produce a multiplication output;
providing the multiplication output to a circuit, wherein the circuit is for operating in a first mode to act as a low-pass filter, and
for operating in a second mode to act as an integrator, wherein the circuit operates in said first mode before the receiver is synchronized to the received signal and operates in the second mode after the receiver is synchronized to the received signal.

7. A method of operating a radio receiver, comprising:
multiplying a received signal by a sequence of generated pulses to produce a multiplication output;
providing the multiplication output to a circuit, wherein the circuit is for operating in a first mode to act as a low pass filter and for operating in a second mode to act as an integrator;
detecting when the receiver has synchronized to the received signal;
operating the circuit in said first mode before the receiver has synchronized to the received signal, and
operating the circuit in the second mode after the receiver has synchronized to the received signal.

8. A method as claimed in claim 7, comprising generating said sequence of pulses in a form corresponding to expected pulses in the received signal.

9. A method as claimed in claim 7, wherein the received signal is an Ultra Wideband radio signal.

10. A wireless communications system, comprising:
a radio transmitter, for generating and transmitting a radio signal; and
a radio receiver, wherein the radio receiver comprises:
a pulse generator, for generating pulses based on an expected received signal;
a multiplier, for multiplying a received signal by the generated pulses; and
a circuit for receiving the multiplier output, wherein said circuit is for operating in a first mode to act as a low-pass filter, and for operating in a second mode to act as an integrator, wherein said circuit operates in said first mode before the receiver is synchronized to the received signal and operates in the second mode after the receiver is synchronized to the received signal.

11. A wireless communications system as claimed in claim 10, wherein said receiver further comprises an analog-to-digital converter, for receiving an output from said circuit.

12. A wireless communications system as claimed in claim 10, wherein said circuit includes an analog-to-digital converter.

13. A wireless communications system comprising:
a radio transmitter, for generating and transmitting a radio signal; and
a radio receiver, wherein the radio receiver comprises:
a pulse generator, for generating pulses based on an expected received signal;
a multiplier, for multiplying a received signal by the generated pulses; and
a circuit for receiving the multiplier output, wherein said circuit is for operating in a first mode to act as a low-pass filter, and wherein said circuit is for operating in a second mode to act as an integrator, wherein said circuit includes
a sigma-delta analog-to-digital converter having a feedback loop, and an integrator, wherein, in said first mode, said integrator is included in said feedback loop of said sigma-delta analog-to-digital converter, and, in said second mode, the output of the multiplier is connected to the integrator, and the integrator output is connected to the sigma-delta analog-to-digital converter.

14. A wireless communications system comprising:
a radio transmitter, for generating and transmitting a radio signal; and
a radio receiver, wherein the radio receiver comprises:
a pulse generator, for generating pulses based on an expected received signal;
a multiplier, for multiplying a received signal, comprising a pulse sequence, by the generated pulses; and
a circuit for receiving the multiplier output, wherein said circuit is for operating in a first mode to act as a low-pass filter, and wherein said circuit is for operating in a second mode to act as an integrator, wherein said circuit includes an analog-to-digital converter, and
wherein said receiver further comprises means for controlling said circuit to operate in said first mode before the generated pulses are synchronized to the received pulse sequence, and to operate in the second mode when the generated pulses are synchronized to the received pulse sequence.

* * * * *